(12) United States Patent
Pasupathi

(10) Patent No.: US 12,204,937 B2
(45) Date of Patent: Jan. 21, 2025

(54) CONFIGURABLE ORCHESTRATION FOR DATA PIPELINES

(71) Applicant: International Business Machines Corporation, Armonk, NY (US)

(72) Inventor: Ranjeeth Pasupathi, Coimbatore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/805,485

(22) Filed: Jun. 6, 2022

(65) Prior Publication Data

US 2023/0393892 A1 Dec. 7, 2023

(51) Int. Cl.
*G06F 9/48* (2006.01)
*G06F 9/54* (2006.01)
*G06F 16/2455* (2019.01)

(52) U.S. Cl.
CPC ............ *G06F 9/4881* (2013.01); *G06F 9/544* (2013.01); *G06F 16/24568* (2019.01)

(58) Field of Classification Search
CPC ...... G06F 8/61; G06F 9/5038; G06F 11/3055; G06F 13/4045; G06F 15/177; G06F 16/151; G06F 16/258; G06F 40/40; G06F 9/4881; G06F 11/1012; G06F 8/60; G06F 16/283; G06F 16/24544; G06F 9/5066; G06F 16/28; G06F 16/215; G06N 5/022; G06Q 40/04; H04L 41/0806; H04L 63/1441; A63F 13/2145; H04W 12/68
See application file for complete search history.

(56) References Cited

U.S. PATENT DOCUMENTS

| 8,978,034 B1* | 3/2015 | Goodson | G06F 16/24544 |
| | | | 718/101 |
| 10,747,700 B1* | 8/2020 | Sarusi | G06F 13/4045 |
| 2006/0094502 A1* | 5/2006 | Katayama | A63F 13/2145 |
| | | | 463/31 |
| 2013/0158892 A1* | 6/2013 | Heron | G06F 11/3055 |
| | | | 702/34 |
| 2014/0282849 A1* | 9/2014 | Collison | H04W 12/68 |
| | | | 726/1 |

(Continued)

OTHER PUBLICATIONS

"The 7 best data pipeline tools of 2021", Community, Apr. 21, 2020, 13 pages, © Kebooola 2020, <https://www.keboola.com/blog/the-7-best-data-pipeline-tools-of-2020>.

(Continued)

*Primary Examiner* — Dustin Nguyen
(74) *Attorney, Agent, or Firm* — Joseph P. Curcuru

(57) ABSTRACT

Orchestrating data pipelines in a pre-orchestrated manner. In some instances, workflows and microservices are performed in stages. The order in which these stages are performed are pre-dominantly non-sequential in order to ensure that the most relevant stages are performed in a manner that allows the workflows to be processed and microservices to be utilized in the most efficient manner possible. In some instances, when the processes in the first stage is complete, a broadcast message is published to a topic that indicates that the first stage is completed and the second stage can commence. In order to determine which processes can be performed in the second stage, a configuration table is utilized. This general process is repeated until each stage in the data pipeline is complete.

20 Claims, 4 Drawing Sheets

(56) References Cited

U.S. PATENT DOCUMENTS

| | | | | |
|---|---|---|---|---|
| 2016/0321308 | A1* | 11/2016 | Brinnand | G06F 16/215 |
| 2018/0048521 | A1* | 2/2018 | Nair | G06F 8/61 |
| 2018/0069925 | A1* | 3/2018 | Lavasani | G06F 16/28 |
| 2019/0130004 | A1* | 5/2019 | Singh | G06F 16/283 |
| 2019/0190541 | A1* | 6/2019 | Tao | G06F 11/1012 |
| 2019/0243836 | A1* | 8/2019 | Nanda | G06F 16/258 |
| 2019/0332449 | A1* | 10/2019 | Adolfsson | G06Q 40/04 |
| 2019/0377817 | A1* | 12/2019 | McCluskey | G06F 16/258 |
| 2020/0233403 | A1* | 7/2020 | Gelbke | G06F 8/60 |
| 2020/0242487 | A1 | 7/2020 | Jain | |
| 2020/0265118 | A1* | 8/2020 | Rofrano | G06F 40/40 |
| 2020/0293920 | A1* | 9/2020 | Chung | G06N 5/022 |
| 2020/0387475 | A1 | 12/2020 | Khanna | |
| 2021/0006636 | A1* | 1/2021 | Koehler | H04L 41/0806 |
| 2021/0136122 | A1* | 5/2021 | Crabtree | H04L 63/1441 |
| 2021/0149751 | A1* | 5/2021 | Ferstay | G06F 9/4881 |
| 2021/0240519 | A1 | 8/2021 | Gitelman | |
| 2021/0383258 | A1* | 12/2021 | O'Riordan | G06F 15/177 |
| 2021/0385251 | A1* | 12/2021 | Crabtree | G06F 16/951 |
| 2022/0066813 | A1* | 3/2022 | Taher | G06F 9/5038 |
| 2023/0153183 | A1* | 5/2023 | Adolfsson | G06F 9/5066 |
| | | | | 719/314 |

OTHER PUBLICATIONS

Gordon, David, "Faster processing and reduced resource consumption with incremental data refreshing", Pyramid Analytics, Dec. 3, 2020, 7 pages, <https://www.pyramidanalytics.com/blog/details/blog-faster-processing-and-reduced-resource-consumption-with-incremental-data-refreshing>.

"Microservices", Wikipedia, Printed Jun. 12, 2023, 13 pages. https://en.wikipedia.org/wiki/Microservices.

"Pipeline (computing)", Wikipedia, printed Jun. 12, 2023, 5 pages. https://en.wikipedia.org/wiki/Pipeline_(computing)#.

* cited by examiner

500

| STAGE # | SERVICE | ADDITIONAL CONFIGURATION (INPUT JSON FOR A STAGE)? |
|---|---|---|
| 1 | STAGE 1 | |
| 2 | STAGE 4 | |
| 3 | STAGE 2 | |
| 4 | STAGE 4 | |
| 5 | STAGE 3 | |
| 6 | STAGE 5 | |
| 7 | STAGE 4 | |
| 8 | STAGE 6 | |

FIG. 5

CONFIGURABLE ORCHESTRATION FOR DATA PIPELINES

BACKGROUND

The present invention generally relates to the field of data processing, and more specifically to dynamically processing data pipelines that include multiple stages.

The Wikipedia entry for "Pipeline (computing)" (sometimes referred to herein as a "data pipeline") (as of Apr. 14, 2022) states that a data pipeline is a "set of data processing elements connected in a series, where the output of one element is the input of the next one. The elements of a pipeline are often executed in parallel or in time-sliced fashion."

The Wikipedia entry for "Microservices" (as of Apr. 14, 2022) states as follows: "A microservice architecture—a variant of the service-oriented architecture (SOA) structural style—arranges an application as a collection of loosely-coupled services. In a microservices architecture, services are fine-grained and the protocols are lightweight. The goal is that teams can bring their services to life independent of others. Loose coupling reduces all types of dependencies and the complexities around it, as service developers do not need to care about the users of the service, they do not force their changes onto users of the service."

SUMMARY

According to an aspect of the present invention, there is a method, computer program product and/or system that performs the following operations (not necessarily in the following order): (i) receiving, from a data pipeline trigger, a plurality of data pipeline stages, with each data pipeline stage of the plurality of data pipeline stages including information indicative of an operational function; (ii) performing, by a data pipeline module, a first function that corresponds with a first data pipeline stage of the plurality of data pipeline stages; (iii) responsive to the performance of the first function, publishing, to a broadcast topic module, a first message indicating that the performance of the first function is complete; (iv) querying, by the plurality of data pipeline stages to a configuration module, which data pipeline stage must perform a subsequent operational function; and (v) determining, by the configuration module, the subsequent operational function that must be performed.

BRIEF DESCRIPTION OF THE DRAWINGS

FIG. 5 is a table showing information that is generated and used by a first embodiment method according to the present invention.

DETAILED DESCRIPTION

Figure 1:
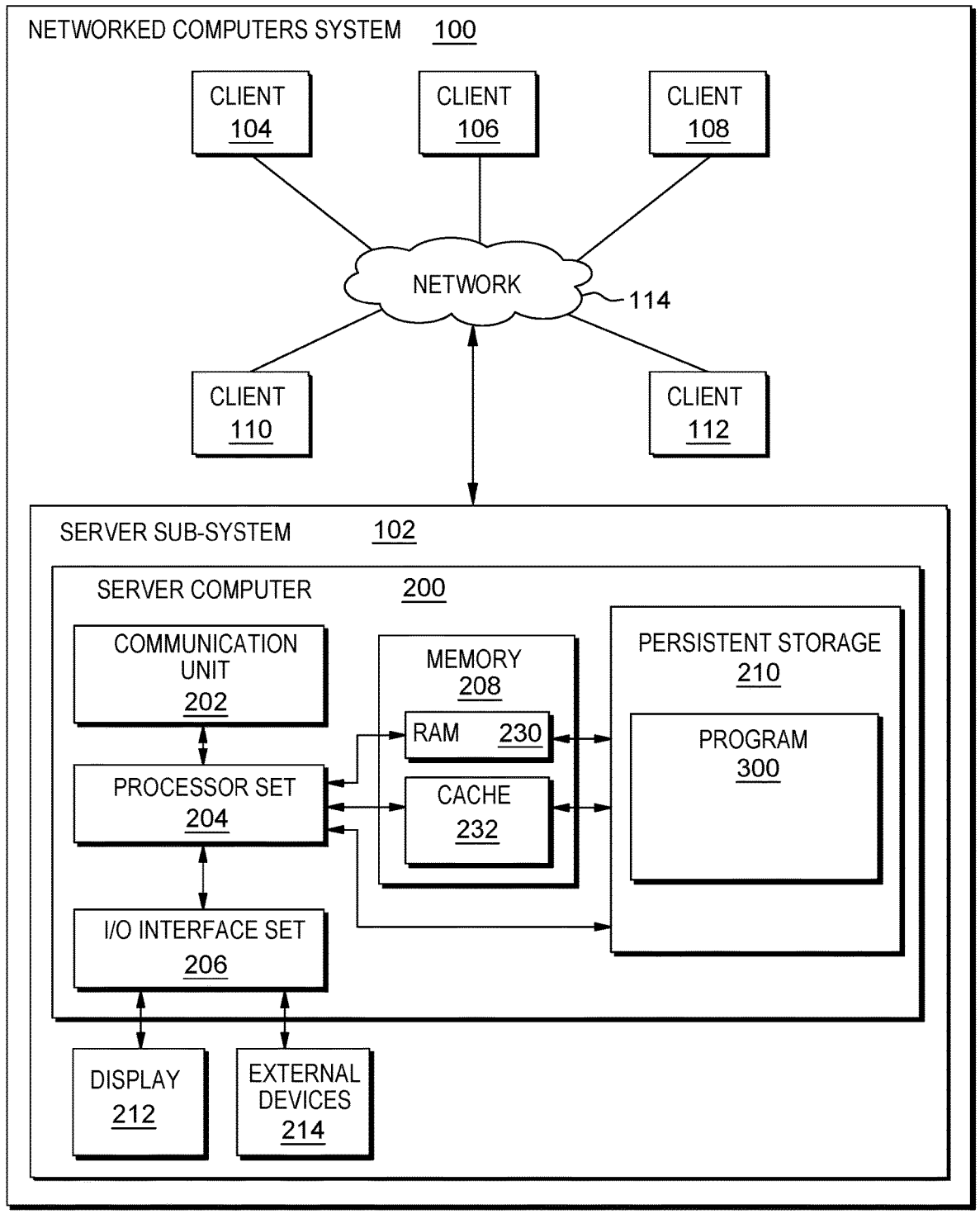
FIG. 1 is a block diagram view of a first embodiment of a system according to the present invention.

Some embodiments of the present invention are directed towards orchestrating data pipelines in a pre-orchestrated manner. In some instances, workflows and microservices are performed in stages. The order in which these stages are performed are pre-dominantly non-sequential in order to ensure that the most relevant stages are performed in a manner that allows the workflows to be processed and microservices to be utilized in the most efficient manner possible.

In some instances, when the processes in the first stage is complete, a broadcast message is published to a topic that indicates that the first stage is completed and the second stage can commence. In order to determine which processes can be performed in the second stage, a configuration table is utilized. This general process is repeated until each stage in the data pipeline is complete.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
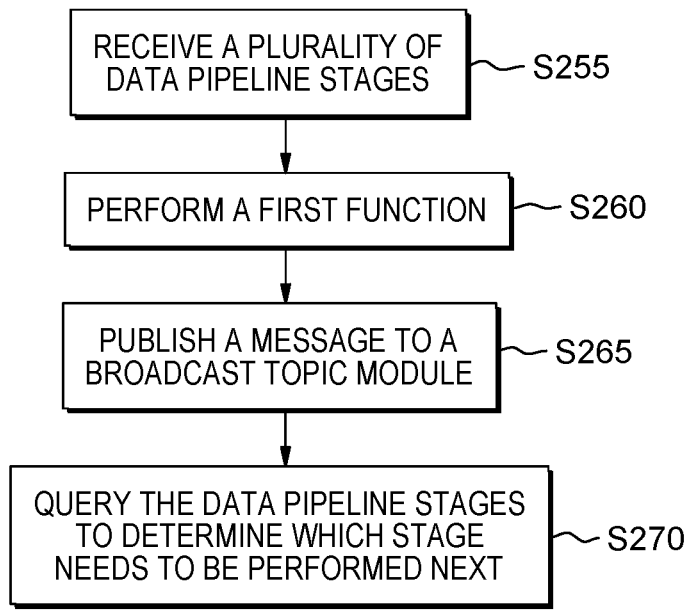
FIG. 2 is a flowchart showing a first embodiment method performed, at least in part, by the first embodiment system.
Figure 3:
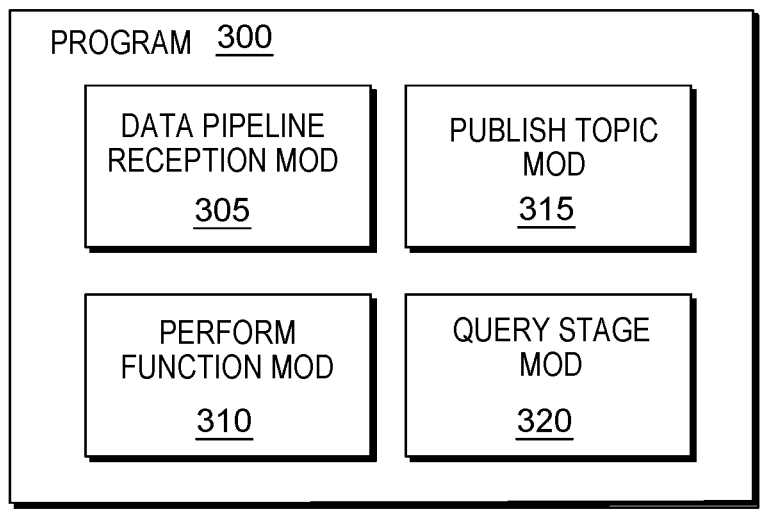
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where data pipeline reception module ("mod") 305 receives a plurality of data pipeline stages from a data pipeline trigger. In some embodiments of the present invention, each data pipeline stage that is received from the data pipeline trigger includes information that indicates a function that is to be performed and instructions to perform that function.

In some embodiments of the present invention, these functions can include multiple workflows that are being executed on a local computing server (such as server subsystem 102 shown in FIG. 1) or on a cloud computing server (not shown). Alternatively, these functions can include performing tasks that are required by a multitude of microservices that are configured by a user.

Processing proceeds to operation S260, where perform function mod 310 performs a first function that corresponds with a first data pipeline stage (from the set of received data pipeline stages discussed in connection with operation S255, above). In some embodiments of the present invention, perform function mod 310 executes the multiple workflows that are run on the local computing server or on the cloud computing server in a manner that produces an objective output that signals the completion of the multiple workflows. In some embodiments, the output can include a notification to the user who is executing the multiple workflows. Alternatively, the output can include triggering a new set of workflows that are dependent upon the completion of the initial set of workflows that are being executed.

Figure 4:
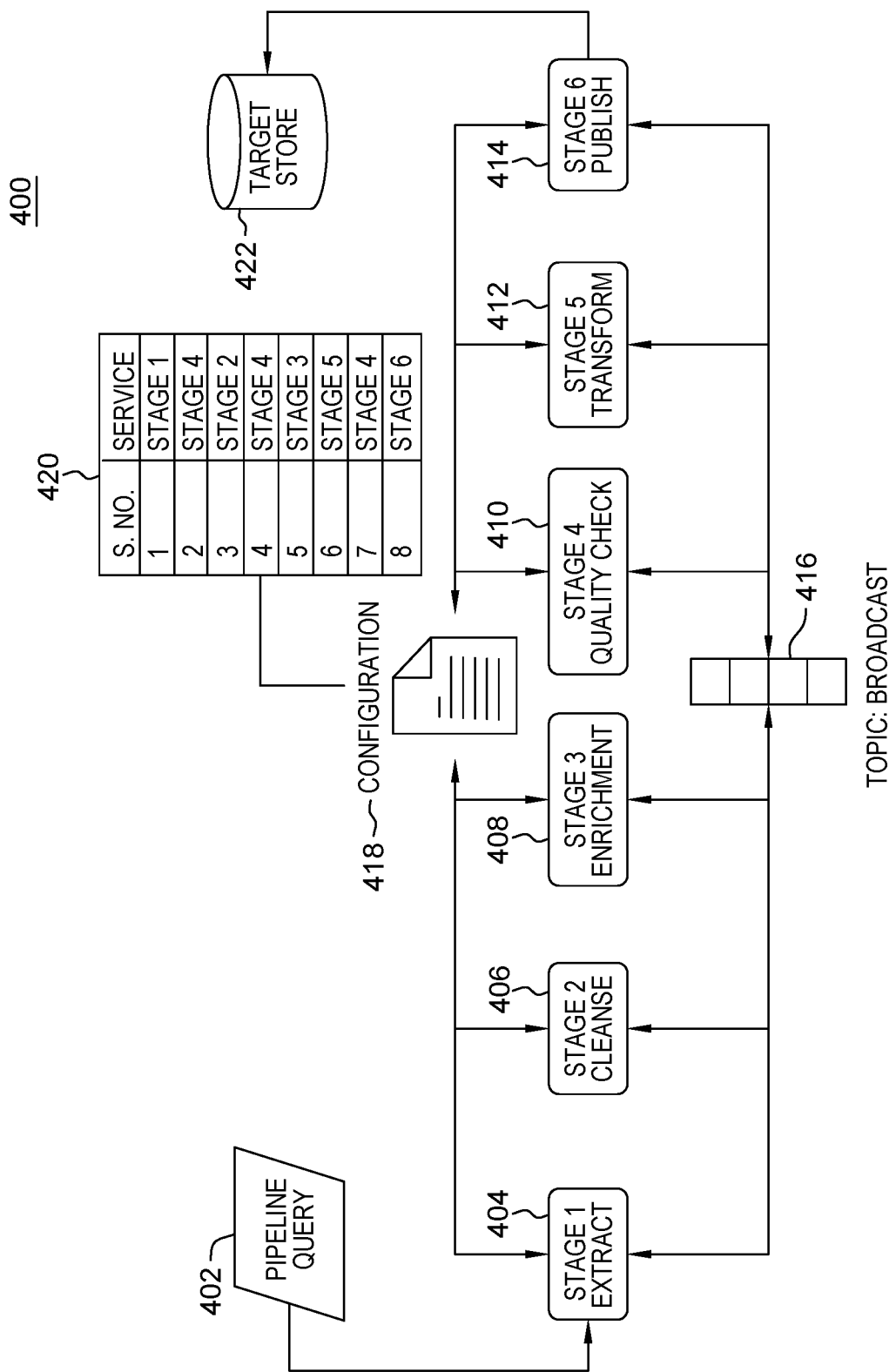
FIG. 4 is a flow diagram of a first embodiment system according to the present invention.

Processing proceeds to operation S265, where publish topic mod 315 publishes a message to a broadcast topic module (such as broadcast topic module 416 shown in FIG. 4). In some embodiments, this message includes information that describes the function that was most recently performed and the fact that this function is now complete and does not need to be performed a second time. Alternatively, the message can include information that indicates that a particular resource that is being utilized (such as a first container) has performed a substantial portion of the function (that is, the set of the workflows being performed) and that a second resource (such as a second container) must now begin processing the remainder of the set of workflows.

Processing finally proceeds to operation S270, where query stage mod 320 queries the plurality of data pipeline stages to in order to determine which stage needs to be performed next. In some embodiments, query stage module 320 consults a configuration table (such as configuration table 500 shown in FIG. 5) to make this determination.

III. Further Comments and/or Embodiments

In the age of big data analytics, various analytics pipelines have processes that operate at multiple stages. These stages include extract, cleanse, enrich, quality check, load, etc., and they form the core of any multi-faceted project. In some instances, data orchestration and/or data processing tools such as NiFi, Airflow, Camel, and the like are used. (Note: the term(s) "NIFI," "AIRFLOW" and/or "CAMEL" may be subject to trademark rights in various jurisdictions throughout the world and are used here only in reference to the products or services properly denominated by the marks to the extent that such trademark rights may exist.) In addition to a simple data processing approach, event driven approaches are utilized.

Each data orchestration and/or processing tools shines in certain aspects, but all of these tools lack the ability to allow the configuration to be externalized, thereby giving the control to the person who needs to alter this orchestration when given specific customer requirements. Embodiments of the present invention provide a method to externalize the orchestration from the tool(s) that are used for it.

Some embodiments of the present invention utilize the following tools and techniques: (i) event streaming platforms (such as Kafka, RabbitMQ, and the like); (ii) configuration data files that dictate the stages, order, and any supporting parameters; (iii) broadcast message topic that is subscribed to by all stages; and (iv) a software helper module that answers queries from the individual stages. (Note: the term(s) "KAFKA" and/or "RABBITMQ" may be subject to trademark rights in various jurisdictions throughout the world and are used here only in reference to the products or services properly denominated by the marks to the extent that such trademark rights may exist.)

Embodiments of the present invention provide a method for configuring and orchestrating a set of events. This method includes at least the following operations (not necessarily in the following order): (i) all of the stage implementations subscribe to a single message topic; (ii) when complete, each stage implementation writes a message to the topic with its outcome; (iii) an integer is internally incremented on the message topic each time a message is written to the topic; (iv) when a message arrives in the topic, all stages get notified; (v) each stage calls the helper to see what the current stage is and determine which stage is the next stage that is ready to be executed; (vi) if a given stage is determined to be the next stage to execute a function, then that given stage executes the function and the remaining stages ignores the message; (vii) the pipeline is triggered with this integer set to one (1), meaning the message is for the first stage; and (viii) the helper module depends on a configuration file where the order (repeat executions as well), stage name and details that are needed for the execution of a stage is made available by the person in charge of the deployment.

Configurable orchestration for a data pipeline is illustrated in flow diagram 400 of FIG. 4. Flow diagram 400 includes: pipeline trigger 402; stage 1 (extract) 404; stage 2 (cleanse) 406; stage 3 (enrichment) 408; stage 4 (quality check) 410; stage 5 (transform) 412; stage 6 (publish) 414; broadcast topic module 416; configuration module 418; configuration table 420; and target store 422.

It is important to note that the stages mentioned in this disclosure are for illustrative purposes, and can include more stages or fewer stages depending on the need of a given target system.

In some embodiments, the "extract" stage refers to actions where data is translated from a source dataset into a standard format that is processed and/or otherwise utilized by software modules or computer systems in subsequent stages.

In some embodiments, the "cleanse" stage refers to the removal of empty records. Additionally, the "cleanse" stage refers to processes that update default values (where necessary) and removing unnecessary data fields.

In some embodiments, the "enrichment" stage refers to performing aggregations of data where appropriate. Additionally, the "enrichment" stage refers to creating new calculated fields and new entities out of existing entities in order to drive the insights that a given pipeline is expected to generate.

In some embodiments, the "quality check" stage refers to validating data for its correctness (that is, determining whether the data that is output meets certain objective criteria based on the expectation for that output data). In some embodiments, the "quality check" stage does not necessarily need to be designated at the fourth stage. It can occur at any particular point in the data pipeline process based on the need to perform quality checks on the data that is being generated at the various stages of the data pipeline.

In some embodiments, the "transform" stage refers to modifying the entities into a structure. In some embodiments, this structure can be a "star" and/or "snowflake" structure for multi-dimensional analysis.

In some embodiments, the "publish" stage refers to publishing the transformed data to a persistent storage. In some embodiments, this can include publishing the data to a relational database management system (RDBMS).

Configuration table 500 of FIG. 5 is a configuration table that includes information that determines the order in which various stages in the data pipeline will be processed. In some embodiments, the configuration table indicates that the various services in the data pipeline stages must be performed sequentially (that is, at stage 1, service 1 must be performed; at stage 2, service 2 must be performed, and so on). Alternatively, in the vast majority of instances, the configuration table will indicate that the various services in the data pipeline stages are performed non-sequentially. For example, as shown in configuration table 500, at stage 1, service 1 is performed, and at stage 2, service 4 is performed. In some embodiments, the order in which these services are performed are determined by a user based upon a previous successful run of the data pipeline.

Alternatively, the order in which these services are performed are determined through the use of machine learning methods that incorporate feedback from performing multiple runs of the data pipeline so that the most efficient order is the selected order for future runs of the data pipeline for a given computing task.

In some embodiments of the present invention, a payload message scheme is provided as logic for configuration table 500. One example of the payload message includes the following:

```
{
  Common: {
    SeqIncrement: 2
    // What if the service fails to increment? We should enforce it using a standard
mechanism instead of letting the service do this. Config lookup and seqincrement can themselves
be based on a config lib/service which services reuse.
    tenantID: <>
    // Tenant and other details.
  },
  Section 1: {
    // service related, or functionality related
  },
  Section 2: {
  }
  ...
}
```

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Orchestration/data orchestration: automating the process that translates raw data into a state that is ready to generate meaningful insights.

What is claimed is:

1. A computer-implemented method (CIM) comprising:
receiving, from a data pipeline trigger, a plurality of data pipeline stages, with each data pipeline stage of the plurality of data pipeline stages including information indicative of an operational function, wherein stage implementations of the plurality of data pipeline stages subscribe to a single message topic;
performing, by a data pipeline module, a first function that corresponds with a first data pipeline stage of the plurality of data pipeline stages;
responsive to the performance of the first function, publishing, to a broadcast topic module, a first message indicating that the performance of the first function is complete, wherein the first message is subscribed to by all stages, wherein an integer is internally incremented on a message topic each time a message is written to the message topic, and wherein each stage implementation writes a message to a topic with an outcome;

querying, by the plurality of data pipeline stages to a configuration module, which data pipeline stage must perform a subsequent operational function; and determining, by the configuration module, the subsequent operational function that must be performed.

2. The CIM of claim 1 further comprising:
responsive to the determination of the subsequent operational function, performing, by the data pipeline module, the subsequent operational function; and
responsive to the performance of the subsequent operational function, updating, by the configuration module, the integer indicating a number of operational functions that have been performed by the data pipeline module by one.

3. The CIM of claim 1 wherein the configuration module determines the subsequent operational function that must be performed by consulting a configuration table.

4. The CIM of claim 1 further comprising:
storing data generated from the performance of the operational functions to a target data store.

5. The CIM of claim 1 wherein an operational function includes translating data from a source data set into a standard format.

6. The CIM of claim 1 wherein an operational function includes publishing transformed data to a relational database management system (RDBMS).

7. A computer program product (CPP) comprising:
a machine readable storage device; and
computer code stored on the machine readable storage device, with the computer code including instructions and data for causing a processor(s) set to perform operations including the following:
receiving, from a data pipeline trigger, a plurality of data pipeline stages, with each data pipeline stage of the plurality of data pipeline stages including information indicative of an operational function, wherein stage implementations of the plurality of data pipeline stages subscribe to a single message topic;
performing, by a data pipeline module, a first function that corresponds with a first data pipeline stage of the plurality of data pipeline stages;
responsive to the performance of the first function, publishing, to a broadcast topic module, a first message indicating that the performance of the first function is complete, wherein the first message is subscribed to by all stages, wherein an integer is internally incremented on a message topic each time a message is written to the message topic, and wherein each stage implementation writes a message to a topic with an outcome;
querying, by the plurality of data pipeline stages to a configuration module, which data pipeline stage must perform a subsequent operational function; and
determining, by the configuration module, the subsequent operational function that must be performed.

8. The CPP of claim 7 further comprising:
responsive to the determination of the subsequent operational function, performing, by the data pipeline module, the subsequent operational function; and
responsive to the performance of the subsequent operational function, updating, by the configuration module, the integer indicating a number of operational functions that have been performed by the data pipeline module by one.

9. The CPP of claim 7 wherein the configuration module determines the subsequent operational function that must be performed by consulting a configuration table.

10. The CPP of claim 7 further comprising:
storing data generated from the performance of the operational functions to a target data store.

11. The CPP of claim 7 wherein an operational function includes translating data from a source data set into a standard format.

12. The CPP of claim 7 wherein an operational function includes publishing transformed data to a relational database management system (RDBMS).

13. A computer system (CS) comprising:
a processor(s) set;
a machine readable storage device; and
computer code stored on the machine readable storage device, with the computer code including instructions and data for causing the processor(s) set to perform operations including the following:
receiving, from a data pipeline trigger, a plurality of data pipeline stages, with each data pipeline stage of the plurality of data pipeline stages including information indicative of an operational function, wherein stage implementations of the plurality of data pipeline stages subscribe to a single message topic;
performing, by a data pipeline module, a first function that corresponds with a first data pipeline stage of the plurality of data pipeline stages;
responsive to the performance of the first function, publishing, to a broadcast topic module, a first message indicating that the performance of the first function is complete, wherein the first message is subscribed to by all stages, wherein an integer is internally incremented on a message topic each time a message is written to the message topic, and wherein each stage implementation writes a message to a topic with an outcome;
querying, by the plurality of data pipeline stages to a configuration module, which data pipeline stage must perform a subsequent operational function; and
determining, by the configuration module, the subsequent operational function that must be performed.

14. The CS of claim 13 further comprising:
responsive to the determination of the subsequent operational function, performing, by the data pipeline module, the subsequent operational function; and
responsive to the performance of the subsequent operational function, updating, by the configuration module, the integer indicating a number of operational functions that have been performed by the data pipeline module by one.

15. The CS of claim 13 wherein the configuration module determines the subsequent operational function that must be performed by consulting a configuration table.

16. The CS of claim 13 further comprising:
storing data generated from the performance of the operational functions to a target data store.

17. The CS of claim 13 wherein an operational function includes translating data from a source data set into a standard format.

18. The CS of claim 13 wherein an operational function includes publishing transformed data to a relational database management system (RDBMS).

19. The CIM of claim 1 further comprising:
responsive to receiving the message topic, notifying the plurality of data pipeline stages, wherein the plurality of data pipeline stages call a helper to identify a current stage of the plurality of data pipeline stages and determine which stage of the plurality of data pipeline stages is ready to be executed, wherein helper module depends on a configuration file where the order (repeat executions as well), stage name and details that are needed for the execution of a stage is made available by the person in charge of the deployment; and responsive to a stage being identifying as being ready to execute a function, executing, through the stage, a function while remaining stages in the plurality of data pipeline stages ignore the message.

20. The CIM of claim 1, wherein the message topic comprises information that indicates that a first container has performed a at least a portion of the function and that a second container must begin processing the remainder of the function.

\* \* \* \* \*